(12) United States Patent
Uehara

(10) Patent No.: US 9,242,866 B2
(45) Date of Patent: Jan. 26, 2016

(54) ACTIVATED CARBON MANUFACTURING SYSTEM

(71) Applicant: Haruo Uehara, Saga (JP)

(72) Inventor: Haruo Uehara, Saga (JP)

(\*) Notice: Subject to any disclaimer, the term of this patent is extended or adjusted under 35 U.S.C. 154(b) by 0 days.

(21) Appl. No.: 14/529,724

(22) Filed: Oct. 31, 2014

(65) Prior Publication Data

US 2015/0050192 A1     Feb. 19, 2015

Related U.S. Application Data

(63) Continuation of application No. PCT/JP2012/061615, filed on May 2, 2012.

(51) Int. Cl.
    *C01B 31/08*        (2006.01)
    *C01B 31/00*        (2006.01)

(52) U.S. Cl.
    CPC ............... *C01B 31/088* (2013.01); *C01B 31/08* (2013.01); *Y02E 60/366* (2013.01); *Y02P 20/13* (2015.11)

(58) Field of Classification Search
    CPC ...... C01B 31/00; C01B 31/08; C01B 31/088; Y02E 60/30; Y02E 60/36; Y02E 60/366
    See application file for complete search history.

(56) References Cited

U.S. PATENT DOCUMENTS

2007/0101912 A1    5/2007   Kohchi et al.
2007/0270511 A1*   11/2007   Melnichuk ............ C07C 29/149
                                                        518/700
2009/0080142 A1    3/2009   Nanba et al.
2010/0178624 A1*   7/2010   Srinivasachar ......... F23K 5/002
                                                        431/253

FOREIGN PATENT DOCUMENTS

| AT | 407871 B | 7/2001 |
|---|---|---|
| JP | 2004161574 A | 6/2004 |
| JP | 2007186403 A | 7/2007 |
| WO | 2005063923 B1 | 10/2005 |
| WO | 2011059095 A1 | 5/2011 |

OTHER PUBLICATIONS

Machine translation of AT 407871 B, provided in IDS dated Nov. 10, 2015, and filed Jul. 25, 2001.*
International Search Report dated Jul. 24, 2012 from corresponding International Application No. PCT/JP2012/061615.

* cited by examiner

*Primary Examiner* — Natasha Young
(74) *Attorney, Agent, or Firm* — Dingman, McInnes & McLane, llp

(57) ABSTRACT

An activated carbon manufacturing system can efficiently heat a wood material or carbide to promote a drying process, a carbonization process and an activation process in manufacturing activated carbon, and can reduce the environmental load involved in the manufacture of activated carbon. Specifically, a drying process of a wood material is achieved by heating the wood material with saturated steam at an appropriate temperature, and an initial carbonization process of the wood material is achieved by heating the wood material with superheated steam. Therefore, the wood material can be heated with high heat transfer efficiency, so that the heat loss can be reduced, and neither a drying device nor a first carbonizing device produces a gas containing a harmful constituent in the heating processes, so that the adverse effect on the environment can be reduced.

18 Claims, 2 Drawing Sheets

ACTIVATED CARBON MANUFACTURING SYSTEM

RELATED APPLICATIONS

This patent application is a continuation of International Application No. PCT/JP2012/061615, now WO 2013/164894, filed on May 12, 2012, now pending, the contents and teachings of each of which are hereby incorporated by reference in their entirety.

FIELD

The present invention relates to an activated carbon manufacturing system that manufactures activated carbon by treating a wood material, such as lumber chips, wood pieces and scrap wood.

BACKGROUND

Conventionally, wood pieces or scraps resulting from lumber sawing or processing, cut tree branches, tree bark, felled trees, wood chips resulting from crushing of scrap wood or other waste wood have often been disposed of by incineration, reclamation or the like. In recent years, from the viewpoint of the effect of the disposal by incineration, reclamation or the like on the environment, there has been proposed a method of carbonizing the waste wood and activating the carbide to produce activated carbon for use in order to exploit the waste and reduce the amount of waste to be disposed of.

An example of such conventional activated carbon manufacturing apparatuses is described in JP 2004-161574 A.

SUMMARY

Technical Problem

As described in the patent literature cited above, the conventional activated carbon manufacturing apparatus manufactures activated carbon by carbonizing a wood material, such as waste wood, in a furnace to produce a carbide and activating the carbide. Each of the process of carbonizing the wood material and the process of activating the carbide involves heating the wood material or carbide, and a large amount of heat is supplied to the wood material or carbide placed in the furnace. As a heat source for such heating, heat produced by combustion of a fossil fuel is commonly used.

However, in the case of the externally heated type, which involves transferring heat through the furnace wall in each of the carbonization process and the activation process, the efficiency of heat transfer from the combustion gas of the fossil fuel to the wood material or carbide in the furnace is extremely low due to the properties of the combustion gas deriving from the fossil fuel. Therefore, the heat loss is high, and a large amount of fuel is needed to achieve each process with reliability. And if there is a problem with the availability of the fuel, there is a problem that the processes is likely to be unable to be appropriately achieved.

In addition, the fossil fuel is flammable, so that there is a limitation on the use thereof, and the places or the like of use thereof are likely to be limited. Therefore, the places where the fossil fuel can be used to manufacture activated carbon are also limited, and it is difficult to provide a simple and economical manufacturing environment in which activated carbon is produced from waste wood at a place near the place where the waste wood is generated. In addition, the used and exhaust gas contains an air-polluting constituent, and a measure needs to be taken to prevent the air-polluting constituent from adversely affecting the environment. Thus, there is also a problem that using the fossil fuel leads to an increase of the manufacturing cost of the activated carbon. Furthermore, the exhaust gas contains carbon dioxide, which is a greenhouse effect gas, so that there is also a concern about global warming.

The present invention has been devised to solve the problems described above, and an object of the present invention is to provide an activated carbon manufacturing system that can efficiently heat a wood material or carbide to promote a drying process, a carbonization process and an activation process in manufacturing activated carbon, and can reduce the environmental load involved in the manufacture of activated carbon.

Solution to Problem

An activated carbon manufacturing system according to the present invention comprises at least: a drying device that heats and dries a small piece of wood material; a carbonizing part that heats the dried wood material to carbonize the wood material; and an activating device that activates a carbide resulting from the carbonization of the wood material to produce activated carbon, the drying device is an externally heated device that uses saturated steam at approximately 100 to 120° C. as a heat source and heats a heating target placed in a furnace thereof from outside of the furnace, the carbonizing part includes one or more first carbonizing devices, which are externally heated devices that use superheated steam at approximately 150 to 400° C. as a heat source and heat a heating target placed in a furnace thereof from outside of the furnace and one or more second carbonizing devices that heat a heating target placed in a furnace thereof with a heat source at approximately 400 to 800° C., the one or more second carbonizing devices being disposed in a stage subsequent to the first carbonizing devices, the activating device is a device that heats the carbide placed in a furnace thereof from outside of the furnace with a heat source at approximately 800 to 950° C., and the used saturated steam from the drying device and the used superheated steam from the first carbonizing device condense into water and are then heated again into saturated steam and superheated steam for recycled use.

According to the present invention, as described above, the drying process of the wood material is achieved by heating the wood material with saturated steam at an appropriate temperature, and the initial carbonization process of the wood material is achieved by heating the wood material with superheated steam. Therefore, the wood material can be heated with high heat transfer efficiency, so that the heat loss can be reduced, and neither the drying device nor the first carbonizing device produces a gas containing a harmful constituent in the heating processes, so that the adverse effect on the environment can be reduced. In addition, since activated carbon can be efficiently produced from waste wood and made usable, useful materials contained in the waste are not wasted and can be effectively utilized, the amount of waste can be reduced, and the adverse effect on the environment can be reduced.

As required, in the activated carbon manufacturing system, the heat source used in the second carbonizing device in the carbonizing part and/or the heat source used in the activating device is a combustion gas resulting from combustion of a mixed gas of hydrogen and oxygen produced by electrolysis of water.

According to the present invention, as described above, the combustion gas used as a heat source in the second carbonizing device or the like is a mixed gas of hydrogen and oxygen, and water is the only material produced by the combustion. Therefore, in production of the combustion gas used to achieve high temperature, carbon dioxide or other air-polluting constituents are not produced, and the adverse effect on the environment can be further reduced.

As required, in the activated carbon manufacturing system, the heat source used in the second carbonizing device in the carbonizing part and/or the heat source used in the activating device is a gas mixture of a combustion gas resulting from combustion of a fuel composed of a flammable organic material and a mixed gas of hydrogen and oxygen produced by electrolysis of water.

According to the present invention, as described above, the second carbonizing device or the like heats the carbide or the like by using, as a heat source, a gas mixture of a combustion gas resulting from combustion of a fuel composed of an organic material, such as a common fossil fuel or a pyrolysis gas separated from the wood material in the first carbonizing device, and a mixed gas of hydrogen and oxygen, while the combustion gas and the mixed gas reacts with each other. Therefore, even if the combustion gas at high temperature contains a harmful constituent, such as an air-polluting material, the harmful constituent can be rendered harmless by reaction with the mixed gas, the amount of harmful constituents in the exhaust gas discharged from the second carbonizing device and the activating device after heating can be substantially reduced, and the adverse effect on the environment can be reduced.

As required, the activated carbon manufacturing system further comprises a pure water producing device that produces pure water by removing an impurity from raw material water in the course of evaporation and condensation, the pure water produced by the pure water producing device is supplied as the water to be electrolyzed to produce the mixed gas, and the pure water producing device heats the water to a temperature suitable for evaporation by heat exchange between moisture separated and removed from the wood material by the drying device drying the wood material and the raw material water.

According to the present invention, as described above, heat exchange occurs between the moisture evaporated and separated from the wood material by the drying device heating the wood material and the raw material water for pure water in the pure water producing device to heat the raw material water for pure water with the heat of the moisture separated from the wood material, thereby increasing the temperature of the water to a temperature at which water evaporates. Therefore, the heat imparted to the wood material by the drying device can be appropriately recovered, the temperature of the evaporated water can be efficiently lowered to produce water in the liquid phase, the amount of heat additionally externally supplied to increase the temperature of the raw material water for pure water to the temperature at which water evaporates in the pure water production process can be reduced, and thus, the energy consumption of the entire system can be reduced.

As required, in the activated carbon manufacturing system, heat produced by combustion of a mixed gas of hydrogen and oxygen produced by electrolysis of water is used as a heating source used in the drying device to produce the saturated steam and/or a heating source used in the first carbonizing device in the carbonizing part to produce the superheated steam.

According to the present invention, as described above, heat produced by combustion of a mixed gas of hydrogen and oxygen is used to heat water to produce saturated steam to be introduced to the drying device and to produce superheated steam to be introduced to the first carbonizing device, and water is the only resultant material discharged in the combustion. Therefore, in production of the combustion gas at high temperature used for heating water, carbon dioxide or other air-polluting constituents are not produced, and the effect of the manufacture of activated carbon on the environment can be further reduced.

As required, the activated carbon manufacturing system further comprises a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

According to the present invention, as described above, heat exchange occurs between the moisture removed from the drying device and/or the first carbonizing device and the working fluid of the steam power cycle to heat the working fluid and increase the temperature of the working fluid, thereby causing a change of phase of the working fluid and making the working fluid conduct work, and the resulting motive power is used to generate electric power. Therefore, the heat of the moisture of the saturated steam introduced to the drying device, used therein and then removed therefrom and the moisture of the superheated steam introduced to the first carbonizing device, used therein and then removed therefrom can be appropriately recovered by heat exchange with the working fluid, so that the generated heat can be efficiently utilized. In addition, since each part of the system can use the electric power generated by the system, the amount of electric power externally supplied can be reduced, and the system operating cost can be reduced.

As required, in the activated carbon manufacturing system, moisture separated and removed from the wood material by the drying device drying the wood material is also used to heat the working fluid by heat exchange with the working fluid.

According to the present invention, as described above, heat exchange occurs between the moisture evaporated and separated from the wood material by the drying device heating the wood material and the working fluid of the steam power cycle of the heat recovery power generating device to heat the working fluid with the heat of the moisture separated from the wood material, thereby further increasing the amount of heat of the working fluid. Therefore, of the heat imparted to the wood material by the drying device, the heat of the moisture separated from the wood material can be appropriately recovered by heat exchange with the working fluid, so that the generated heat can be efficiently utilized. In addition, the efficiency of power generation by the heat recovery power generating device can be increased, and the amount of generated electric power can be increased, so that the system operating cost can be further reduced.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

First Embodiment of Invention

In the following, an activated carbon manufacturing system according to a first embodiment of the present invention will be described with reference to FIG. 1.

Figure 1:
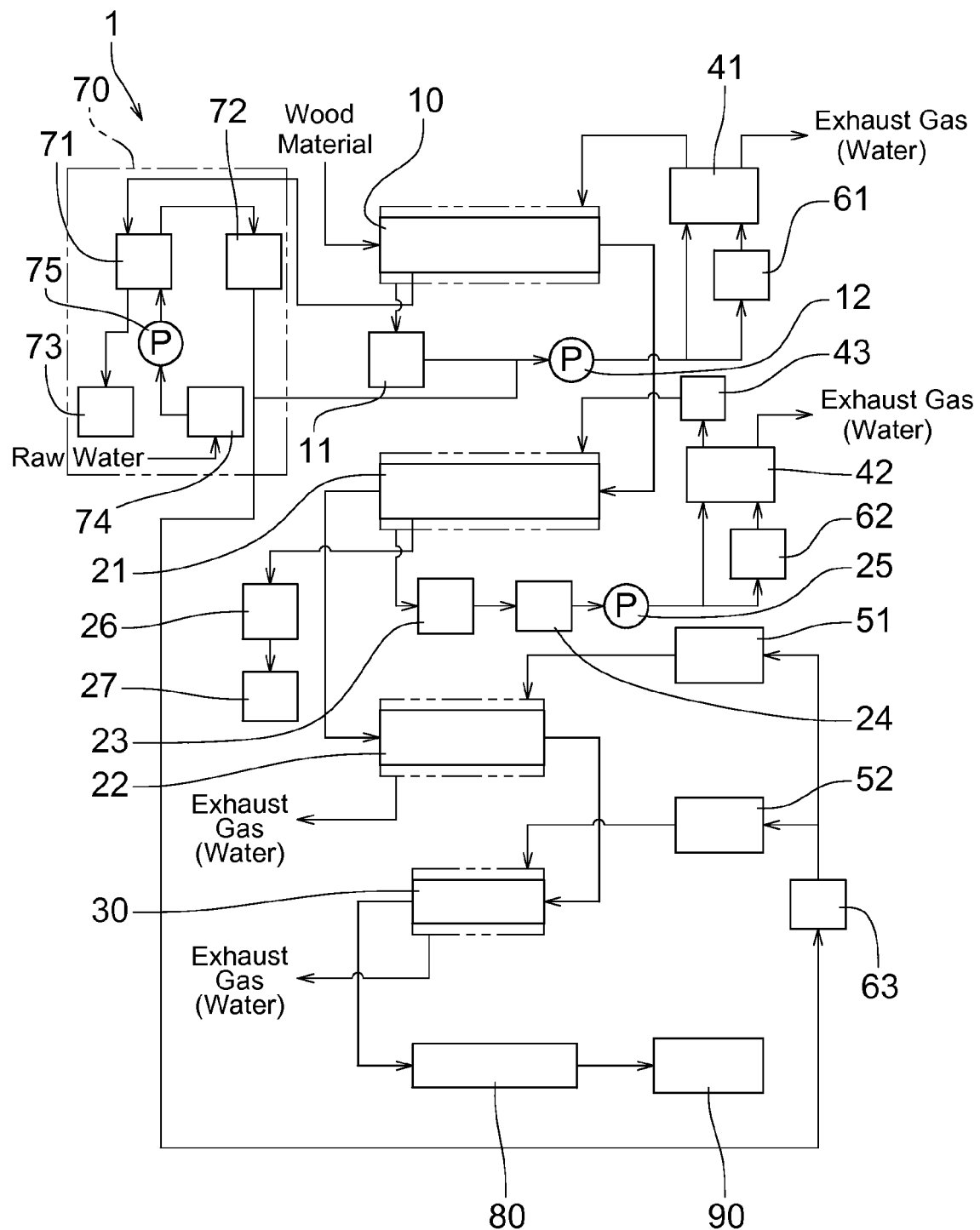
FIG. 1 is a schematic diagram showing a configuration of an activated carbon manufacturing system according to a first embodiment of the present invention.

In FIG. 1, an activated carbon manufacturing system 1 according to this embodiment comprises a drying device 10 that heats and dries a predetermined amount of small pieces of a wood material, a first carbonizing device 21 and a second carbonizing device 22 that serve as a carbonizing part that heats and carbonizes the dried wood material, an activating device 30 that activates the carbide from the carbonizing devices to produce activated carbon, a boiler 41 that heats water to generate saturated steam that serves as a heat source for the drying device 10, a boiler 42 that heats water to generate superheated steam that serves as a heat source for the first carbonizing device 21, a combustor 51 that supplies a combustion gas to the second carbonizing device 22, a combustor 52 that supplies a combustion gas to the activating device 30, electrolyzing devices 61, 62 and 63 that electrolyze water to generate a mixed gas of oxygen and hydrogen and supply the mixed gas as a fuel to the boilers 41 and 42 and the combustors 51 and 52, a pure water producing device 70 that produces pure water and supplies the pure water to the electrolyzing device 63 as raw material water to be electrolyzed, a cooling device 80 that cools the activated carbon produced by the activating device 30, and a storage tank 90 that holds and stores the activated carbon.

The drying device 10 has a known structure of an externally heated rotary-kiln thermal cracking furnace, which is a double cylinder structure in which a gas to serve as a high temperature heat source is introduced into a space between an inner cylinder and an outer cylinder, and the space in the furnace inside the inner cylinder is externally heated through the inner cylinder serving as a furnace wall. The drying device 10 is a device that uses saturated steam at 100 to 120° C., such as saturated steam at approximately 105° C., as the high temperature heat source and dries a predetermined amount of a wood material held in the furnace as a heating target by heating, from outside the furnace, the wood material with the saturated steam to evaporate moisture in the wood material and separate the moisture from the wood material.

The boiler 41 heats water to produce saturated steam and supplies the saturated steam to the drying device 10. As a heating source for the boiler 41 to produce the saturated steam, heat produced by combustion of a mixed gas of hydrogen and oxygen produced by electrolysis of water by the electrolyzing device 61 is used.

The saturated steam once used in the drying device 10 condenses into water, which is temporarily stored in a water tank 11, fed to the boiler 41 through predetermined piping and heated again into saturated steam for recycled use. To feed the water to the boiler 41, a pump 12 that pressurizes and feeds water is disposed at a predetermined point in the piping. However, the pump 12 is a known device used in a common piping system, and detailed descriptions thereof will be omitted.

The moisture containing a vapor phase constituent and a liquid phase constituent dried and separated from the wood material and removed to the outside by the drying device 10 is fed to the pure water producing device 70, where the moisture completely condenses into the liquid phase through heat exchange with water, and the resulting water is collected and held in a predetermined water tank 73.

The carbonizing part that heats and carbonizes the wood material dried by the drying device 10 includes the first carbonizing device 21 and the second carbonizing device 22. The first carbonizing device 21 is disposed in a stage following the drying device 10, holds the wood material dried by the drying device 10 and then removed therefrom in a furnace thereof, and heats and carbonizes the wood material using superheated steam at approximately 150 to 400° C. as a heat source. The second carbonizing device 22 is disposed in a stage following the first carbonizing device, holds the carbide and the wood material yet to be carbonized removed from the first carbonizing device 21 in a furnace thereof, and promote the carbonization using a heat source at approximately 400 to 800° C., specifically, a combustion gas or heated gas introduced thereto, heat produced by electrical heating, or the like.

As with the drying device 10 described above, the first carbonizing device 21 has the known double cylinder structure of the externally heated rotary-kiln thermal cracking furnace. The first carbonizing device 21 is a device that uses superheated steam at approximately 150 to 400° C. as a high temperature heat source and heats, from outside the furnace, a wood material held as a heating target in the furnace with the superheated steam to cause thermal cracking of the wood material, thereby carbonizing the wood material.

As in a common carbonization process, an inert gas, such as nitrogen, is introduced as an atmosphere into the furnace of the first carbonizing device 21, in which the wood material is held.

The boiler 42 heats water to produce steam, and a superheater 43 superheats the steam to produce superheated steam and supplies the superheated steam to the first carbonizing device 21. As a heating source for the boiler 42 to produce steam and for the superheater 43 to produce superheated steam, heat produced by combustion of the mixed gas of hydrogen and oxygen produced by electrolysis of water by the electrolyzing device 62 is used.

The steam once used in the first carbonizing device 21 condenses into water in an external condenser 23, and the water is temporarily stored in a water tank 24, fed to the boiler 42 through predetermined piping and heated again into superheated steam for recycled use. To feed the water to the boiler 42, a pump 25 that pressurizes and feeds water is disposed at a predetermined point in the piping. However, the pump 25 is a known device used in a common piping system, and detailed descriptions thereof will be omitted.

A gas (pyrolysis gas) separated in the course of the carbonization in the first carbonizing device 21 is removed to the outside of the first carbonizing device 21 and cooled by a condenser 26 to condense into wood vinegar, which is collected in a tank 27.

As with the drying device 10 and the first carbonizing device 21 described above, the second carbonizing device 22 has the known double cylinder structure of the externally heated rotary-kiln thermal cracking furnace. The second carbonizing device 22 is a device that uses the heat source at approximately 400 to 800° C., such as a combustion gas at approximately 800° C., as a high temperature heat source and heats, from outside the furnace, the carbide and the wood material yet to be carbonized held as a heating target in the furnace with the combustion gas, thereby promoting and completing the carbonization.

As in a common carbonization process, an inert gas, such as nitrogen, is introduced as an atmosphere into the furnace of the second carbonizing device 22.

A mixed gas of hydrogen and oxygen produced by electrolysis of water by the electrolyzing device 63 is burned in the combustor 51, and the resulting combustion gas is supplied to the second carbonizing device 22. The combustion gas once used in the second carbonizing device 22 is released as an exhaust gas into the atmosphere through a chimney or the like. The combustion gas contains only water and therefore does not pollute air nor otherwise adversely affects the ambient environment.

As the carbonization in the second carbonizing device progresses, a pyrolysis gas, such as hydrogen and carbon monoxide, is separated. The pyrolysis gas is discharged to the outside of the furnace and rendered harmless before being emitted into the atmosphere.

The carbonizing part described above has one first carbonizing device 21 and one second carbonizing device 22. However, the present invention is not limited to the arrangement, and the carbonizing part may have a plurality of first carbonizing devices and/or a plurality of second carbonizing devices.

As with the drying device 10 described above, the activating device 30 has the known double cylinder structure of the externally heated rotary-kiln thermal cracking furnace. However, the activating device 30 can have any furnace structure other than the rotary kiln furnace structure, such as a flue and smoke tube type, that holds a heating target in the furnace and heats the heating target from outside the furnace through the furnace wall with a predetermined heat source.

The activating device 30 is a device that uses a combustion gas or heated gas at approximately 800 to 950° C. introduced thereto, heat produced by electrical heating, or the like as a high temperature heat source, holds the carbide produced by the second carbonizing device 22 as a heating target in the furnace, and heats and activates the carbide with the combustion gas from outside the furnace, thereby producing activated carbon. In the activation, a noncondensing gas constituent, such as hydrogen or nitrogen, is removed from the carbide.

As in a common activated carbon manufacturing process that involves activating a carbide with a gas, a reactant gas, such as carbon dioxide or steam, is introduced as an atmosphere into the furnace of the activating device 30 in which the carbide is held.

A combustion gas at approximately 900° C., for example, produced by combustion in the combustor 52 of the mixed gas of hydrogen and oxygen produced by electrolysis of water in the electrolyzing device 63 is supplied to the activating device 30. The combustion gas once used in the activating device 30 is released as an exhaust gas into the atmosphere through a chimney or the like. The combustion gas contains only water and therefore does not pollute air nor otherwise adversely affects the ambient environment.

The pure water producing device 70 is a device that produces pure water by removing impurities from water through a sequence of processes of evaporation and condensation of raw material water.

More specifically, the pure water producing device 70 comprises a heating part 71 that heats raw material water for pure water to a temperature suitable for evaporation through heat exchange between the raw material water and the moisture separated and removed from the wood waste by the drying device 10, an evaporation/condensation part 72 that receives the warm water from the heating part 71 and produces pure water by evaporating the warm water in a decompressed space and making the resulting water in the vapor phase condense by heat exchange with cooling water, the water tank 73 that collects the water resulting from the heat exchange and condensation in the heating part 71, a water supply tank 74 that temporarily stores raw water, which is to be used as the raw material for pure water, and supplies the water, and a pump 75 that feeds the raw water to the heating part 71.

The heating part 71 is a known heat exchanger that causes heat exchange between the moisture separated and removed from the wood material by the drying device 10 drying the wood material and the raw material water for pure water. The heating part 71 heats the raw material water for pure water to a predetermined temperature that allows the water to evaporate in the subsequent evaporation/condensation part 72 and make the moisture containing a vapor phase constituent and a liquid phase constituent removed from the drying device 10 completely condense into the liquid phase. The resulting water is collected in the water tank 73.

The evaporation/condensation part 72 is a device that comprises a known evaporation part that produces water in the vapor phase by efficiently evaporating the water heated to the predetermined temperature by the preceding heating part 71 by introducing the water into a container decompressed to a pressure equal to or lower than a saturation pressure thereof, and a known condensation part that has flow channels separated by a heat transfer part therein and makes the water in the vapor phase, which flows in one of the flow channels, condense by heat exchange with cooling water, which flows in another flow channel.

The evaporation part receives the warm water heated by the heating part 71 directly from the heating part 71 and evaporates the warm water to produce water in the vapor phase that contains little impurities. The evaporation part may have any flash evaporation mechanism, such as of a multi flash type and a spray flash type. The remaining water in the liquid phase that has not evaporated in the evaporation part is discharged to the outside of the evaporation/condensation part 72 and fed back to the heating part 71.

As the heat exchanger that causes heat exchange between the water in the vapor phase evaporated in the evaporation part and the cooling water, the condensation part has a known structure. The condensation of the water in the vapor phase in the condensation part provides pure water that contains little impurities. As the cooling water, raw water from the water supply tank 74 is supplied to the condensation part.

In the subsequent stage of a pure water flow channel of the evaporation/condensation part 72, the evaporation/condensation part 72 is connected to piping that is in communication with the electrolyzing devices 61 and 63 and the boiler 41 and feeds the pure water produced in the condensation part to the piping. On the other hand, a cooling water flow channel of the evaporation/condensation part 72 is connected to an inlet side of the heating part 71, and the raw water used as the cooling water for condensation of the water in the vapor phase and increased in temperature flows into the heating part 71.

The pure water producing device 70 supplies pure water as water to be electrolyzed in the electrolyzing device 63 for producing the mixed gas. The mixed gas produced by the electrolyzing device 63 is burned in the second carbonizing device 22 and the combustors 51 and 52 in the activating device 30.

Part of the pure water produced by the pure water producing device 70 is mixed with water that is condensation of the saturated steam used in the drying device 10, and the resulting mixed water is fed to and heated by the boiler 41 into saturated steam, which is used in the drying device 10.

The electrolyzing devices 61, 62 and 63 produce a mixed gas of hydrogen and oxygen by electrolysis of water. The electrolyzing devices 61, 62 and 63 produce hydrogen and oxygen of the mixed gas in a mole fraction of 2 to 1, and combustion of the mixed gas produces only water.

The water to be electrolyzed in the electrolyzing device 61, which supplies the mixed gas to the boiler 41, is a mixed water of the water that is condensation of the saturated steam used in the drying device 10 and pure water. The water to be electrolyzed in the electrolyzing device 62, which supplies the mixed gas to the boiler 42, is the water that is condensation of the superheated steam used in the first carbonizing device.

On the other hand, the water to be electrolyzed in the electrolyzing device 63, which supplies the mixed gas to the combustors 51 and 52, is the pure water produced by the pure water producing device 70. Owing to the way of production, the pure water has an extremely small electrical conductivity, hydrogen and oxygen can be produced with high purity, and deterioration of electrodes used for the electrolysis can be suppressed.

Next, an activated carbon manufacturing process that occurs in the activated carbon manufacturing system according to this embodiment will be described. It is assumed that a sufficient amount of water is supplied to the boilers 41 and 42, the boilers 41 and 42 produces steam, saturated steam from the boiler 41 is introduced at a sufficient flow rate to the drying device 10 as a heat source, and superheated steam produced by the superheater 43 heating the steam from the boiler 42 is introduced at a sufficient flow rate to the first carbonizing device 21 as a heat source. In addition, the mixed gas of hydrogen and oxygen is continuously burned in the combustors 51 and 52, and the resulting combustion gas is introduced to the second carbonizing device 22 and the activating device 30 at appropriate temperatures.

In a state where a predetermined amount of small pieces of wood material is put in the furnace of the drying device 10, which is an enclosed space, the drying device 10 heats the furnace with saturated steam at approximately 100 to 120° C. supplied from the boiler 41, thereby heating the moisture in the wood material in the furnace to cause the moisture to evaporate and separate from the wood material. The evaporated moisture is removed from the furnace and fed to the heating part 71 of the pure water producing device 70, where the evaporated moisture exchanges heat with water at a lower temperature that is a raw material for pure water and condenses, and the resulting water in the liquid phase flows into the water tank 73.

The dried wood material whose moisture has evaporated in the drying device 10 is removed from the furnace after a lapse of a predetermined time in which one procedure in the drying device 10 is completed, and fed to the first carbonizing device 21 in such a manner that the dried wood material is isolated from the outside air to prevent the wood material from absorbing moisture again.

In a state where a predetermined amount of the dried wood material is put in the furnace of the first carbonizing device 21, which is an enclosed space containing only an inert gas, such as nitrogen, serving as a furnace atmosphere, the first carbonizing device 21 heats the furnace with superheated steam supplied from the boiler 42 and the superheater 43, thereby heating the wood material to approximately 150 to 400° C. in the inert gas atmosphere for a predetermined time (one hour or so) to produce a carbide.

In this process, part of the wood material remains without being carbonized. The wood material yet to be carbonized is removed along with the carbide from the furnace of the first carbonizing device 21, and fed to the subsequent second carbonizing device 22 in such a manner that the wood material is isolated from the outside air. In the first carbonizing device 21, a pyrolysis gas is produced as the carbonization progresses. The pyrolysis gas is removed to the outside of the first carbonizing device 21 and cooled to condense into wood vinegar. The wood vinegar is collected in the tank 27.

In a state where a predetermined amount of the carbide and the wood material yet to be carbonized removed from the first carbonizing device 21 is put in the furnace of the second carbonizing device 22, which is an enclosed space containing only an inert gas, such as nitrogen, as a furnace atmosphere, the second carbonizing device 22 heats, from outside the furnace, the carbide and the wood material yet to be carbonized with the combustion gas at approximately 800° C. produced by the combustor 51 for a predetermined time (one hour or so) to promote the carbonization in the inert gas atmosphere, thereby completely carbonizing the wood material yet to be carbonized into a carbide.

The resulting carbide is removed from the furnace of the second carbonizing device 22 and fed to the subsequent activating device 30 in such a manner that the carbide is isolated from the outside air. In the second carbonizing device 22, a noncondensing pyrolysis gas, such as hydrogen or carbon monoxide, is separated as the carbonization progresses. The gas, such as hydrogen or carbon monoxide, is removed to the outside of the second carbonizing device 22 and released into the atmosphere through a chimney or the like.

In a state where the carbide removed from the second carbonizing device 22 is put in the space in the furnace, which is an enclosed space containing only an activating gas, such as carbon dioxide, as a furnace atmosphere, the activating device 30 heats the furnace with the combustion gas at approximately 900° C. produced by the combustor 52 to heat the carbide to approximately 700 to 900° C. in the carbon dioxide atmosphere for a predetermined time (three hours or so), thereby activating the carbide and producing activated carbon.

The resulting activated carbon is cooled to room temperature in the cooling device 80 and collected in the storage tank 90. Once a predetermined amount of activated carbon is stored, the activated carbon is conveyed for use or other purposes.

As described above, in the activated carbon manufacturing system according to this embodiment, the drying device 10 performs a drying process for a wood material by heating the wood material with saturated steam at an appropriate temperature, and the first carbonizing device 21 performs an initial carbonization process for the wood material by heating the wood material with superheated steam. Therefore, the wood material can be efficiently heated with a reduced heat loss, and the drying device 10 and the first carbonizing device 21 do not discharge any gas containing a harmful constituent in the heating processes, so that adverse effects on the environment can be reduced. In addition, the combustion gas at high temperature used in the second carbonizing device 22 and the activating device 30 is produced by combustion of the mixed gas of hydrogen and oxygen, so that the combustion produces only water. Therefore, carbon dioxide or other air-polluting constituents are not produced during production of the combustion gas, which is used to achieve high temperature, so that adverse effects on the environment can be further reduced.

In the activated carbon manufacturing system according to the embodiment described above, the boilers 41 and 42 use heat produced by combustion of the mixed gas of hydrogen and oxygen to produce saturated steam and superheated steam and supply the saturated steam and the superheated steam to the drying device and the first carbonizing device as a heat source. However, the present invention is not limited to the arrangement, and saturated steam and superheated steam may be produced using combustion heat of a common fossil fuel or waste heat of other commercial plants and supplied to the drying device and the first carbonizing device.

In the activated carbon manufacturing system according to the embodiment described above, the combustion gas produced by combustion of the mixed gas of hydrogen and oxygen in the combustors 51 and 52 is introduced as heat sources for the second carbonizing device 22 of the carbonizing part and the activating device 30. However, the present invention is not limited to the arrangement, and any combustion gas can be introduced that is produced by combustion of a fuel composed of a flammable organic material, such as a common fossil fuel, the pyrolysis gas separated from the wood material in the course of the carbonization in the first carbonizing device 21, or a fuel produced from the wood vinegar produced by condensation of the pyrolysis gas.

In that case, if the combustion gas is mixed with the mixed gas of hydrogen and oxygen produced by electrolysis of water before being introduced into the second carbonizing device and the activating device, the reaction between the combustion gas and the mixed gas progresses while heating occurs in each device. Therefore, even if the combustion gas at high temperature contains a harmful constituent, such as an air-polluting material, the harmful constituent can be rendered harmless through the reaction with the mixed gas, so that the amount of the harmful constituent contained in the exhaust gas resulting from the heating processes in the second carbonizing device and the activating device can be considerably reduced, and the influence on the environment can be reduced.

In the case where a combustion gas produced by combustion of a fuel derived from a pyrolysis gas separated from a wood material is used as a heat source, any of the useful materials contained in the wood material can be used. Therefore, in production of the combustion gas at high temperature used as a heat source, the amount of the fuel added externally can be reduced, and the energy consumption of the entire system can be reduced.

In the activated carbon manufacturing system according to the embodiment described above, the drying device 10 dries the wood material, the first carbonizing device 21 carbonizes the dried wood material, the second carbonizing device 22 carbonizes the remaining wood material yet to be carbonized, and the activating device 30 activates the resulting carbide to produce activated carbon. That is, processes in the respective parts sequentially occur. However, in the case where the drying process, the carbonization processes and the activation process take different lengths of time for completion, and a waiting time occurs between successive processes, the processes in the respective parts can occur in parallel with each other. For example, the first carbonizing device 21 can carbonize a predetermined amount of dried wood material previously stored while the drying device 10 is drying the wood material, or the activating device 30 can activate a predetermined amount of carbide previously stored while the first carbonizing device 21 or the second carbonizing device 22 is carbonizing the wood material. In that case, the operation waiting time of each device part can be reduced, so that each part can efficiently operate, and if the amount of carbide to be produced is such that the process of producing the carbide needs to be performed a plurality of times, the total process time of the entire system can be reduced. In addition, the mixed gas from the electrolyzing device 63 can be supplied to and burned in the operating combustors 51 and 52 with reliability, so that the mixed gas can be prevented from being released without being used.

In the activated carbon manufacturing system according to the embodiment described above, the pure water produced by the pure water producing device 70 is supplied to the electrolyzing device 63 that produces the mixed gas of hydrogen and oxygen. However, the present invention is not limited to the arrangement, and water that is not pure water but is sufficiently pure not to hinder electrolysis can be supplied to the electrolyzing device and used for electrolysis. In that case, the pure water producing device 70 can be omitted. Similarly, the water that is mixed with the water produced in the drying device 10 as a result of condensation of used steam and then fed to the boiler 41 and the electrolyzing device 61 can be water other than pure water.

Second Embodiment of Invention

An activated carbon manufacturing system according to a second embodiment of the present invention will be described with reference to FIG. 2.

Figure 2:
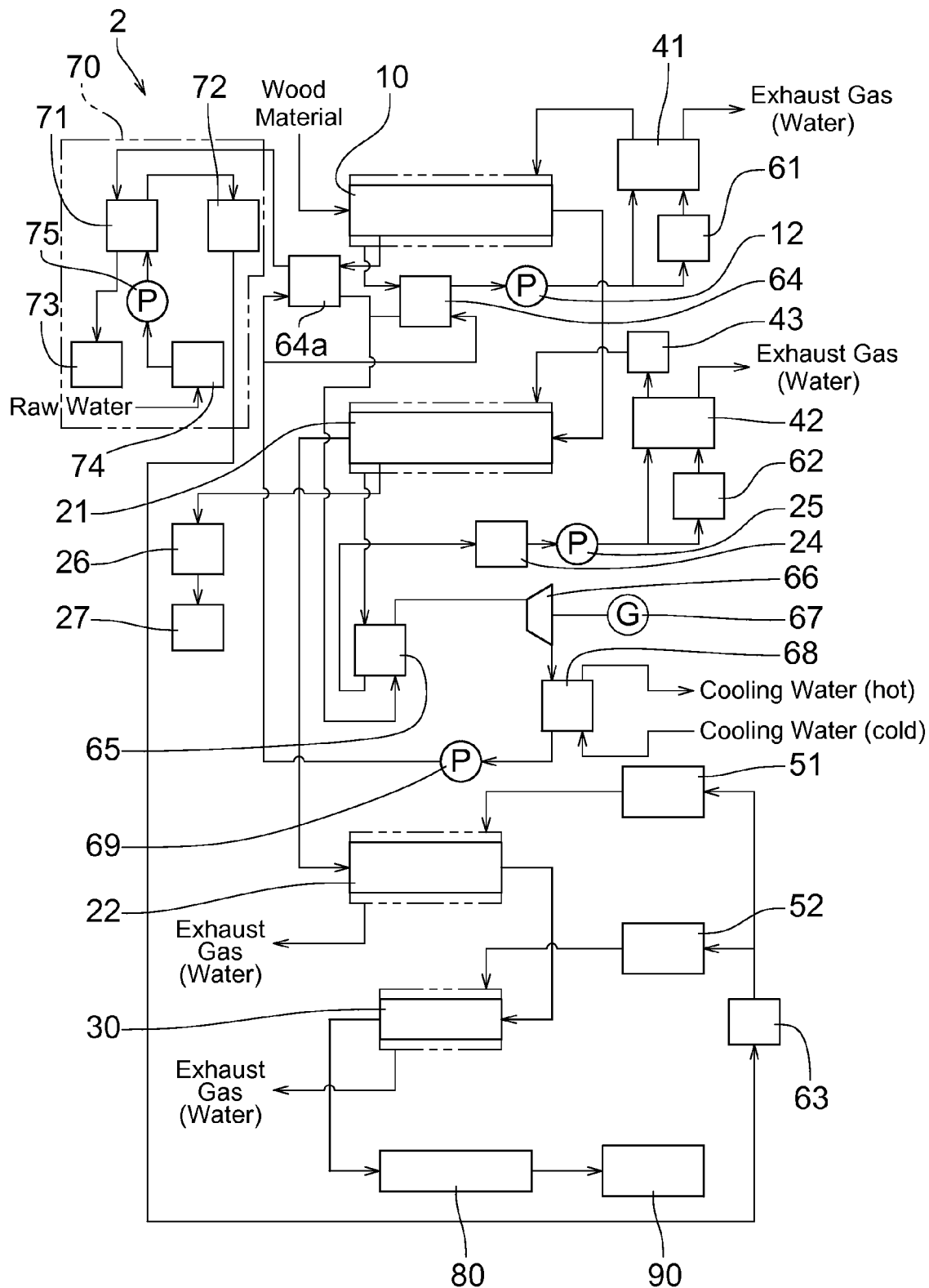
FIG. 2 is a schematic diagram showing a configuration of an activated carbon manufacturing system according to a second embodiment of the present invention.

In FIG. 2, an activated carbon manufacturing system 2 according to this embodiment comprises the drying device 10, the first carbonizing device 21 and the second carbonizing device 22, the activating device 30, the boilers 41 and 42, the combustors 51 and 52, the electrolyzing devices 61, 62 and 63, the pure water producing device 70, the cooling device 80 and the storage tank 90, as with the activated carbon manufacturing system according to the first embodiment. The activated carbon manufacturing system 2 differs from the activated carbon manufacturing system according to the first embodiment in that it further comprises a heat recovery power generating device 60 that generates electric power by using heat of the used saturated steam from the drying device 10 and the used superheated steam from the first carbonizing device 21.

The saturated steam introduced to the drying device 10 and used in the drying device 10 exits the drying device 10 in the vapor phase or in a multiphase state (vapor phase and liquid phase), and moisture from the saturated steam is introduced to the heat recovery power generating device 60. The superheated steam introduced to the first carbonizing device 21 and used in the first carbonizing device 21 exits the first carbonizing device 21 as a vapor in a dried state or saturated state or in a multiphase state (vapor phase and liquid phase), and moisture from the superheated steam is introduced to the heat recovery power generating device 60. The moisture from the saturated steam from the drying device 10 and the moisture from the superheated steam from the first carbonizing device 21 are introduced to the heat recovery power generating device 60 and used for heat exchange with a working fluid. The remainder of the activated carbon manufacturing system according to the second embodiment is the same as that of the activated carbon manufacturing system according to the first embodiment, and detailed descriptions thereof will be omitted.

The heat recovery power generating device 60 heats a predetermined working fluid with heat of the used saturated steam from the drying device 10 and the used superheated steam from the first carbonizing device 21 to operate a steam power cycle of the working fluid and uses the motive power obtained from the cycle to activate a power generator to generate electric power.

More specifically, the heat recovery power generating device 60 comprises an evaporator 64 that heats and evaporates a working fluid, which is a mixture of a plurality of fluids (ammonia and water, for example) having different boiling points, by heat exchange with the moisture from the saturated steam from the drying device 10 in a state where the constituents of the working fluid are all in the liquid phase, a superheater 65 that further heats the working fluid heated by the evaporator 64 to increase the dryness by heat exchange with the moisture from the superheated steam from the first carbonizing device 21, a turbine 66 serving as an expander that receives the working fluid in the vapor phase from the superheater 65 and converts the thermal energy of the fluid into a motive power, a power generator 67 that is connected to the turbine 66 and uses the rotational motive power to generate electric power, a condenser 68 that causes condensation of the working fluid in the vapor phase from the turbine 66 by heat exchange with cooling water, and a pump 69 serving as a compressor that compresses the working fluid from the condenser 68 and feeds the compressed working fluid to the evaporator 64.

These configurations are the same as those of a power generating device that uses a steam power cycle of a non-azeotropic mixed medium as a working fluid used in a known system, and further detailed descriptions thereof will be omitted. The heat recovery power generating device 60 may use a steam power cycle of a single medium. The cooling water used in the condenser 68 may be seawater, river water or other predetermined coolant that is cooled through circulation in a cooling tower.

The moisture from the saturated steam discharged from the drying device 10 after the drying device 10 heats the wood material is still at a temperature higher than the evaporation temperature of the working fluid. The heat of the moisture can be appropriately recovered by heat exchange with the working fluid at lower temperature in the evaporator 64 in the heat recovery power generating device 60. The moisture from the saturated steam completely condenses into water by heat exchange with the working fluid in the evaporator 64 in the heat recovery power generating device 60, and the resulting water is fed to the boiler 41 through predetermined piping and heated again into saturated steam for recycled use, as in the first embodiment.

The moisture from the superheated steam discharged from the first carbonizing device 21 after the first carbonizing device 21 heats the wood material is at a temperature even higher than the temperature of the moisture from the steam discharged from the drying device 10. The heat of the moisture can be appropriately recovered by heat exchange with the working fluid in the superheater 65 in the heat recovery power generating device 60. The moisture from the superheated steam completely condenses into water by heat exchange with the working fluid in the superheater 65 in the heat recovery power generating device 60, and the resulting water is fed to the boiler 42 through predetermined piping and heated again into superheated steam for recycled use, as in the first embodiment.

The moisture contained in the wood material is separated from the wood material by the drying device 10 drying the wood material and removed to the outside of the drying device 10 at relatively high temperature. Therefore, the moisture can also be introduced to the heat recovery power generating device 60 and used for heating the working fluid by heat exchange. In that case, if the heat recovery power generating device 60 has a secondary evaporator 64a disposed in parallel with the evaporator 64 so that part of the working fluid flows in the secondary evaporator 64a, and heat exchange between the moisture from the wood material and the working fluid occurs in the secondary evaporator 64a, the heat from the moisture can be efficiently recovered.

Next, an activated carbon manufacturing process that occurs in the activated carbon manufacturing system according to this embodiment will be described. As in the first embodiment described above, it is assumed that saturated steam from the boiler 41 is introduced at a sufficient flow rate to the drying device 10 as a heat source, and superheated steam produced by the superheater 43 heating the steam from the boiler 42 is introduced at a sufficient flow rate to the first carbonizing device 21 as a heat source. In addition, the mixed gas of hydrogen and oxygen is continuously burned in the combustors 51 and 52, and the resulting combustion gas is introduced to the second carbonizing device 22 and the activating device 30 at appropriate temperatures.

As in the first embodiment described above, the drying device 10 heats the furnace, in which a predetermined amount of wood material is put, with saturated steam at approximately 105° C. supplied from the boiler 41, thereby evaporating the moisture in the wood material and separating the moisture from the wood material. The evaporated moisture is removed from the furnace and introduced to the secondary evaporator 64a in the heat recovery power generating device 60, where the evaporated moisture exchanges heat with the working fluid. Then, the moisture flows to the heating part 71 of the pure water producing device 70, exchanges heat with water that is a raw material for pure water in the heating part 71, and the resulting water is collected in the water tank 73.

On the other hand, the moisture from the saturated steam discharged from the drying device 10 after the drying device 10 dries the wood material is introduced to the evaporator 64 in the heat recovery power generating device 60.

As in the first embodiment described above, after a predetermined amount of the wood material dried in the drying device 10 is put in the furnace of the first carbonizing device 21, which is an enclosed space containing only an inert gas, such as nitrogen, serving as a furnace atmosphere, the first carbonizing device 21 heats the furnace with superheated steam at approximately 150 to 400° C. supplied from the boiler 42 and the superheater 43, thereby carbonizing the wood material into a carbide. The moisture from the superheated steam discharged from the first carbonizing device 21 after the first carbonizing device 21 heats the wood material is introduced to the superheater 65 in the heat recovery power generating device 60.

As in the first embodiment described above, after a predetermined amount of the carbide and the wood material yet to be carbonized removed from the first carbonizing device 21 is put in the furnace of the second carbonizing device 22, which is an enclosed space containing only an inert gas, such as nitrogen, as a furnace atmosphere, the second carbonizing device 22 heats the furnace with the combustion gas at approximately 800° C. produced by the combustor 51 to complete the carbonization to produce a carbide.

As in the first embodiment described above, after the carbide removed from the second carbonizing device 22 is put into the space in the furnace of the activating device 30, which is an enclosed space, heats the furnace with the combustion gas at approximately 900° C. produced by the combustor 51 to activate the carbide into activated carbon.

As in the first embodiment described above, the resulting activated carbon is cooled to room temperature in the cooling device 80, temporarily stored in the storage tank 90 and eventually conveyed for use or other purposes.

The heat recovery power generating device 60 recovers the remaining heat of the moisture from the saturated steam discharged from the drying device 10 that is not used by the drying device 10 to heat the wood material by heat exchange between the moisture and the working fluid in the evaporator 64. In addition, the heat recovery power generating device 60 recovers the remaining heat of the moisture from the superheated steam discharged from the first carbonizing device 21 that is not used by the first carbonizing device 21 to heat the wood material by heat exchange between the moisture and the working fluid in the superheater 65.

The working fluid that has increased in temperature and undergone a change of phase in the course of the heat recovery activates the turbine 66 to make the power generator 67 generate electric power. After the working fluid in the heat recovery power generating device 60 exits the turbine 66 and then completely condenses into the liquid phase in the condenser 68, the working fluid is fed by the pump 69 to the evaporator 64 again and then undergoes repeated changes of phase in the steam power cycle to allow the power generator 67 to continuously generate electric power.

As described above, in the activated carbon manufacturing system according to this embodiment, heat exchange occurs between the moisture removed from the drying device 10 and the first carbonizing device 21 and the working fluid of the steam power cycle of the heat recovery power generating device 60 to heat the working fluid and increase the temperature of the working fluid, thereby causing a change of phase of the working fluid and making the working fluid conduct work, and the resulting motive power is used to generate electric power. Therefore, the heat of the moisture of the saturated steam introduced to the drying device 10, used therein and then removed therefrom and the moisture of the superheated steam introduced to the first carbonizing device 21, used therein and then removed therefrom can be recovered by heat exchange with the working fluid, so that the generated heat can be more efficiently utilized. In addition, since each part of the system can use the electric power generated by the system, the amount of electric power externally supplied can be reduced, and the system operating cost can be reduced.

In the activated carbon manufacturing system according to the embodiment described above, the heat recovery power generating device 60 generates electric power by forming a phase change cycle of the working fluid by causing heat exchange between the moisture from the saturated steam discharged from the drying device 10 and the working fluid and heat exchange between the moisture from the superheated steam discharged from the first carbonizing device 21 and the working fluid. As an alternative, however, the heat recovery power generating device 60 may generate electric power by activating the power generator by forming a steam power cycle by recovering, with the working fluid, the heat of exhaust gas discharged from the second carbonizing device 22 and the activating device 30 that use the combustion gas produced by the combustors 51 and 52 by heat exchange between the exhaust gas and the working fluid, and part of the heat generated by the combustors 51 and 52 that is not used in the carbonization and the activation may be converted into electric power for efficient use.

While various embodiments of the innovation have been particularly shown and described, it will be understood by those skilled in the art that various changes in form and details may be made therein without departing from the spirit and scope of the innovation as defined by the appended claims.

REFERENCE SIGNS LIST 1, 2 activated carbon manufacturing system
10 drying device
11, 24 water tank
12, 25 pump
21 first carbonizing device
22 second carbonizing device
23, 26 condenser
27 tank
51, 52 combustor
30 activating device
41, 42 boiler
43 superheater
51, 52 combustor
60 heat recovery power generating device
61, 62, 63 electrolyzing device
64 evaporator
64a secondary evaporator
65 superheater
66 turbine
67 power generator
68 condenser
69 pump
70 pure water producing device
71 heating part
72 evaporation/condensation part
73 water tank
74 water supply tank
80 cooling device
90 storage tank

What is claimed is:

1. An activated carbon manufacturing system, comprising at least:
   a drying device that heats and dries a small piece of wood material;
   a carbonizing part that heats the dried wood material to carbonize the wood material; and
   an activating device that activates a carbide resulting from the carbonization of the wood material to produce activated carbon,
   wherein the drying device is an externally heated device that uses saturated steam at approximately 100 to 120° C. as a heat source and heats a heating target placed in a furnace thereof from outside of the furnace,
   the carbonizing part includes one or more first carbonizing devices, which are externally heated devices that use superheated steam at approximately 150 to 400° C. as a heat source and heat a heating target placed in a furnace thereof from outside of the furnace and one or more second carbonizing devices that heat a heating target placed in a furnace thereof from outside of the furnace with a heat source at approximately 400 to 800° C., the one or more second carbonizing devices being disposed in a stage subsequent to the first carbonizing devices,
   the activating device is a device that heats the carbide placed in a furnace thereof from outside of the furnace with a heat source at approximately 800 to 950° C., and
   the used saturated steam from the drying device and the used superheated steam from the first carbonizing device condense into water and are then heated again into saturated steam and superheated steam for recycled use.

2. The activated carbon manufacturing system according to claim 1, wherein the heat source used in the second carbonizing device in the carbonizing part and/or the heat source used in the activating device is a combustion gas resulting from combustion of a mixed gas of hydrogen and oxygen produced by electrolysis of water.

3. The activated carbon manufacturing system according to claim 2, further comprising:

a pure water producing device that produces pure water by removing an impurity from raw material water in the course of evaporation and condensation, wherein the pure water produced by the pure water producing device is supplied as the water to be electrolyzed to produce the mixed gas, and the pure water producing device heats the water to a temperature suitable for evaporation by heat exchange between moisture separated and removed from the wood material by the drying device drying the wood material and the raw material water.

4. The activated carbon manufacturing system according to claim 3, wherein heat produced by combustion of a mixed gas of hydrogen and oxygen produced by electrolysis of water is used as a heating source used in the drying device to produce the saturated steam and/or a heating source used in the first carbonizing device in the carbonizing part to produce the superheated steam.

5. The activated carbon manufacturing system according to claim 4, further comprising:

a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

6. The activated carbon manufacturing system according to claim 5, wherein moisture separated and removed from the wood material by the drying device drying the wood material is also used to heat the working fluid by heat exchange with the working fluid.

7. The activated carbon manufacturing system according to claim 3, further comprising:

a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

8. The activated carbon manufacturing system according to claim 7, wherein moisture separated and removed from the wood material by the drying device drying the wood material is also used to heat the working fluid by heat exchange with the working fluid.

9. The activated carbon manufacturing system according to claim 2, wherein heat produced by combustion of a mixed gas of hydrogen and oxygen produced by electrolysis of water is used as a heating source used in the drying device to produce the saturated steam and/or a heating source used in the first carbonizing device in the carbonizing part to produce the superheated steam.

10. The activated carbon manufacturing system according to claim 9, further comprising:

a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

11. The activated carbon manufacturing system according to claim 10, wherein moisture separated and removed from the wood material by the drying device drying the wood material is also used to heat the working fluid by heat exchange with the working fluid.

12. The activated carbon manufacturing system according to claim 2, further comprising:

a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

13. The activated carbon manufacturing system according to claim 12, wherein moisture separated and removed from the wood material by the drying device drying the wood material is also used to heat the working fluid by heat exchange with the working fluid.

14. The activated carbon manufacturing system according to claim 1, wherein the heat source used in the second carbonizing device in the carbonizing part and/or the heat source used in the activating device is a gas mixture of a combustion gas resulting from combustion of a fuel composed of a flammable organic material and a mixed gas of hydrogen and oxygen produced by electrolysis of water.

15. The activated carbon manufacturing system according to claim 14, further comprising:

a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

16. The activated carbon manufacturing system according to claim 15, wherein moisture separated and removed from the wood material by the drying device drying the wood material is also used to heat the working fluid by heat exchange with the working fluid.

17. The activated carbon manufacturing system according to claim 1, further comprising:

a heat recovery power generating device that heats a predetermined working fluid with heat of moisture from the used saturated steam discharged from the drying device and/or moisture from the used superheated steam discharged from the first carbonizing device to activate a steam power cycle of the working fluid and uses a motive power produced by the cycle to generate electric power.

18. The activated carbon manufacturing system according to claim 17, wherein moisture separated and removed from the wood material by the drying device drying the wood material is also used to heat the working fluid by heat exchange with the working fluid.

* * * * *